US012658028B2

(12) United States Patent
Gataric

(10) Patent No.: US 12,658,028 B2

(45) **Date of Patent: *Jun. 16, 2026**

(54) HIGH SPEED DETERMINATION OF INTERSECTION TRAVERSAL WITHOUT ROAD DATA

(71) Applicant: STATE FARM MUTUAL AUTOMOBILE INSURANCE COMPANY, Bloomington, IL (US)

(72) Inventor: Alexander Gataric, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/823,457

(22) Filed: Sep. 3, 2024

(65) Prior Publication Data

US 2024/0428679 A1 Dec. 26, 2024

Related U.S. Application Data

(63) Continuation of application No. 17/364,390, filed on Jun. 30, 2021, now Pat. No. 12,106,660.

(51) Int. Cl.

*G08G 1/01* (2006.01)
*G07C 5/08* (2006.01)
*G08G 1/052* (2006.01)

(52) U.S. Cl.

CPC ......... *G08G 1/0104* (2013.01); *G07C 5/0808* (2013.01); *G08G 1/052* (2013.01)

(58) Field of Classification Search

CPC .... G08G 1/0104; G08G 1/052; G08G 1/0129; G08G 1/0145; G08G 1/0112;

(Continued)

(56) References Cited

U.S. PATENT DOCUMENTS 8,768,734 B2 7/2014 Gryan et al.
8,972,076 B2 3/2015 Ogawa et al.

(Continued)

FOREIGN PATENT DOCUMENTS

CN 102903239 B 5/2014
CN 110910636 A 3/2020

(Continued)

OTHER PUBLICATIONS

B. Liu, L. Li and K. Liu, "Study on the evaluation method of probe car system," 2010 IEEE Intelligent Vehicles Symposium, La Jolla, CA, USA, 2010, pp. 554-559, doi: 10.1109/IVS.2010.5548065. (Year: 2010).*

(Continued)

*Primary Examiner* — Tiffany P Young
*Assistant Examiner* — Merritt E Levy
(74) *Attorney, Agent, or Firm* — MARSHALL, GERSTEIN & BORUN LLP

(57) ABSTRACT

Techniques for using vehicle telematics data for high speed determination of intersection traversals are provided. Telematics data from a vehicle trip may be obtained and compared to an area associated with an intersection to attempt to isolate telematics data points that are within the intersection. A simplified line generated based on the isolated telematics data points is then compared to vector lines representing entrances and exits of the intersection to attempt to identify an intersection entrance and exit from the vehicle trip. The simplified line is then compared to an average simplified line representing trips of other vehicles through the same entrance and exit of the same intersection to determine whether the vehicle turned through the intersection. If it is determined that the vehicle turned through the intersection, the telematics data associated with the vehicle trip may be (Continued)

compared to telematics data associated with other vehicle trips through the intersection.

15 Claims, 3 Drawing Sheets

(58) Field of Classification Search
CPC ...... G07C 5/0808; G07C 5/008; G06Q 40/08; G06Q 50/265; G06Q 50/40; G07B 15/00
USPC .......................................................... 701/119
See application file for complete search history.

(56) References Cited

U.S. PATENT DOCUMENTS

| | | | |
|---|---|---|---|
| 9,141,582 | B1 | 9/2015 | Brinkmann et al. |
| 9,311,271 | B2 | 4/2016 | Wright |
| 9,633,487 | B2 | 4/2017 | Wright |
| 9,805,521 | B1 | 10/2017 | Davidson |
| 9,830,748 | B2 | 11/2017 | Rosenbaum |
| 9,990,782 | B2 | 6/2018 | Rosenbaum |
| 10,032,320 | B1 | 7/2018 | Menon et al. |
| 10,055,902 | B2 * | 8/2018 | Davidson ................. G07C 5/02 |
| 10,192,369 | B2 | 1/2019 | Wright |
| 10,198,879 | B2 | 2/2019 | Wright |
| 10,269,190 | B2 | 4/2019 | Rosenbaum |
| 10,467,824 | B2 | 11/2019 | Rosenbaum |
| 10,699,564 | B1 | 6/2020 | Lewis et al. |
| 10,878,328 | B2 | 12/2020 | Mathur et al. |
| 10,916,075 | B1 | 2/2021 | Webster et al. |
| 11,227,452 | B2 | 1/2022 | Rosenbaum |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2012/0158820 | A1 | 6/2012 | Bai et al. |
| 2013/0046559 | A1 | 2/2013 | Coleman et al. |
| 2014/0058761 | A1 | 2/2014 | Freiberger et al. |
| 2014/0149030 | A1 | 5/2014 | Chapman et al. |
| 2015/0285656 | A1 | 10/2015 | Verheyen et al. |
| 2016/0086285 | A1 | 3/2016 | Jordan Peters et al. |
| 2017/0113683 | A1 | 4/2017 | Mudalige et al. |
| 2017/0154531 | A1 | 6/2017 | Funabashi |
| 2017/0372431 | A1 | 12/2017 | Perl et al. |
| 2018/0174484 | A1 | 6/2018 | Bradley et al. |
| 2019/0005812 | A1 | 1/2019 | Matus et al. |
| 2019/0122558 | A1 | 4/2019 | Matsunaga et al. |
| 2019/0311289 | A1 | 10/2019 | Nguyen |
| 2020/0320866 | A1 | 10/2020 | Lewis et al. |
| 2020/0327804 | A1 | 10/2020 | Xu et al. |
| 2020/0342754 | A1 | 10/2020 | Nakamura |
| 2021/0343142 | A1 | 11/2021 | Lewis et al. |
| 2021/0389133 | A1 | 12/2021 | Brizzi et al. |
| 2022/0013005 | A1 * | 1/2022 | Lewis .................... G06V 20/54 |
| 2022/0092893 | A1 | 3/2022 | Rosenbaum |
| 2022/0340148 | A1 | 10/2022 | Rosenbaum |
| 2023/0060300 | A1 | 3/2023 | Rosenbaum |

FOREIGN PATENT DOCUMENTS

| | | | |
|---|---|---|---|
| EP | 3239686 | A1 | 11/2017 |
| EP | 2427726 | B1 | 1/2019 |
| EP | 3578433 | B1 | 8/2020 |
| EP | 3730375 | B1 | 10/2021 |
| EP | 3960576 | A1 | 3/2022 |
| EP | 4190659 | A1 | 6/2023 |
| EP | 4190660 | A1 | 6/2023 |
| WO | WO-13083311 | A1 | 6/2013 |
| WO | WO-2016130719 | A2 | 8/2016 |
| WO | WO-2017221038 | A1 | 12/2017 |

OTHER PUBLICATIONS

Fathi, A., & Krumm, J. (2010). Detecting road intersections from GPS traces. GIScience 2010, Sixth International Conference on Geographic Information Science.

Ezzat, M., Sakr, M., Elgohary, R., & Khalifa, M. E. (2018). Building road segments and detecting turns from GPS tracks. *Journal of computational science*, 29, 81-93.

Schietekat, J. M., & Booysen, M. J. (2013, July). Detection of reckless driving in the Sub-Saharan informal public transportation system using acceleration-sensing telematics. In Eurocon 2013 (pp. 597-601).

* cited by examiner

HIGH SPEED DETERMINATION OF INTERSECTION TRAVERSAL WITHOUT ROAD DATA

CROSS REFERENCE TO RELATED APPLICATIONS

This application is a continuation of U.S. application Ser. No. 17/364,390, which was filed on Jun. 30, 2021, and is titled "HIGH SPEED DETERMINATION OF INTERSECTION TRAVERSAL WITHOUT ROAD DATA," the entirety of which is incorporated by reference herein.

FIELD OF THE DISCLOSURE

The present disclosure generally relates to vehicle telematics and, more particularly, to using vehicle telematics data for high speed determination of intersection traversals.

BACKGROUND

Telematics is a method of monitoring a vehicle. By combining a location determination system (e.g., the global positioning system (GPS)) data with on-board monitoring data, it is possible to record and map where a vehicle is located, how fast the vehicle is traveling or a rate of acceleration associated with the vehicle, how the vehicle is being driven (e.g., directly, based on indications of driver operation such as application of brake or gas pedals, or indirectly, e.g., high acceleration values may correlate to poor driving behavior), and, in some examples, cross reference that information with how the vehicle is operating internally.

Currently, comparing telematics data from one vehicle's turn through an intersection to other vehicles' turns through the same intersection (i.e., to determine how the vehicle's acceleration, speed, braking, cornering, etc., through the intersection compares to other vehicles' acceleration, speed, braking, cornering, etc. through the intersection) can be a processor-intensive task, especially when there are many vehicle trips and many intersections involved. Moreover, some of this processing is ultimately fruitless, as some vehicle trips that initially appear to include a turn through the intersection may actually be trips that do not include a traversal through the intersection at all, or trips that include a U-turn through the intersection or a turn into a parking lot prior to the intersection, i.e., such that comparison to other vehicles' actual turns through the intersection is not relevant.

SUMMARY

In an aspect, a computer-implemented method is provided, comprising: obtaining, by one or more processors, telematics data associated with a vehicle trip; comparing, by the one or more processors, a shape representing an area associated with an intersection to the telematics data associated with the vehicle trip to attempt to isolate one or more telematics data points of the telematics data associated with the vehicle trip that are within the intersection; based on isolating one or more telematics data points of the telematics data associated with the vehicle trip that are within the intersection, comparing, by the one or more processors, the isolated one or more telematics data points to a plurality of vector lines representing entrances and exits of the intersection to attempt to identify both an entrance of the intersection and an exit of the intersection associated with the vehicle trip; based on identifying both an entrance of the intersection and an exit of the intersection associated with the vehicle trip, comparing, by the one or more processors, the isolated one or more telematics data points to an average simplified line representing trips of other vehicles through the same entrance and exit of the same intersection to determine whether the vehicle turned through the intersection; and based on determining that the vehicle turned through the intersection, comparing, by the one or more processors, the isolated one or more telematics data points associated with the vehicle trip to telematics data associated with the trips of other vehicles through the same entrance and exit of the same intersection.

In another aspect, a non-transitory computer-readable storage medium is provided, comprising instructions that, when executed, cause a machine to: obtain telematics data associated with a vehicle trip; compare a shape representing an area associated with an intersection to the telematics data associated with the vehicle trip to attempt to isolate one or more telematics data points of the telematics data associated with the vehicle trip that are within the intersection; based on isolating one or more telematics data points of the telematics data associated with the vehicle trip that are within the intersection, compare the isolated one or more telematics data points to a plurality of vector lines representing entrances and exits of the intersection to attempt to identify both an entrance of the intersection and an exit of the intersection associated with the vehicle trip; based on identifying both an entrance of the intersection and an exit of the intersection associated with the vehicle trip, compare the isolated one or more telematics data points to an average simplified line representing trips of other vehicles through the same entrance and exit of the same intersection to determine whether the vehicle turned through the intersection; and based on determining that the vehicle turned through the intersection, compare the isolated one or more telematics data points associated with the vehicle trip to telematics data associated with the trips of other vehicles through the same entrance and exit of the same intersection.

In still another aspect, a computing device is provided, comprising a processor and a memory storing instructions that, when executed by the processor, cause the processor to: obtain telematics data associated with a vehicle trip; compare a shape representing an area associated with an intersection to the telematics data associated with the vehicle trip to attempt to isolate one or more telematics data points of the telematics data associated with the vehicle trip that are within the intersection; based on isolating one or more telematics data points of the telematics data associated with the vehicle trip that are within the intersection, compare the isolated one or more telematics data points to a plurality of vector lines representing entrances and exits of the intersection to attempt to identify both an entrance of the intersection and an exit of the intersection associated with the vehicle trip; based on identifying both an entrance of the intersection and an exit of the intersection associated with the vehicle trip, compare the isolated one or more telematics data points to an average simplified line representing trips of other vehicles through the same entrance and exit of the same intersection to determine whether the vehicle turned through the intersection; and based on determining that the vehicle turned through the intersection, compare the isolated one or more telematics data points associated with the vehicle trip to telematics data associated with the trips of other vehicles through the same entrance and exit of the same intersection.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
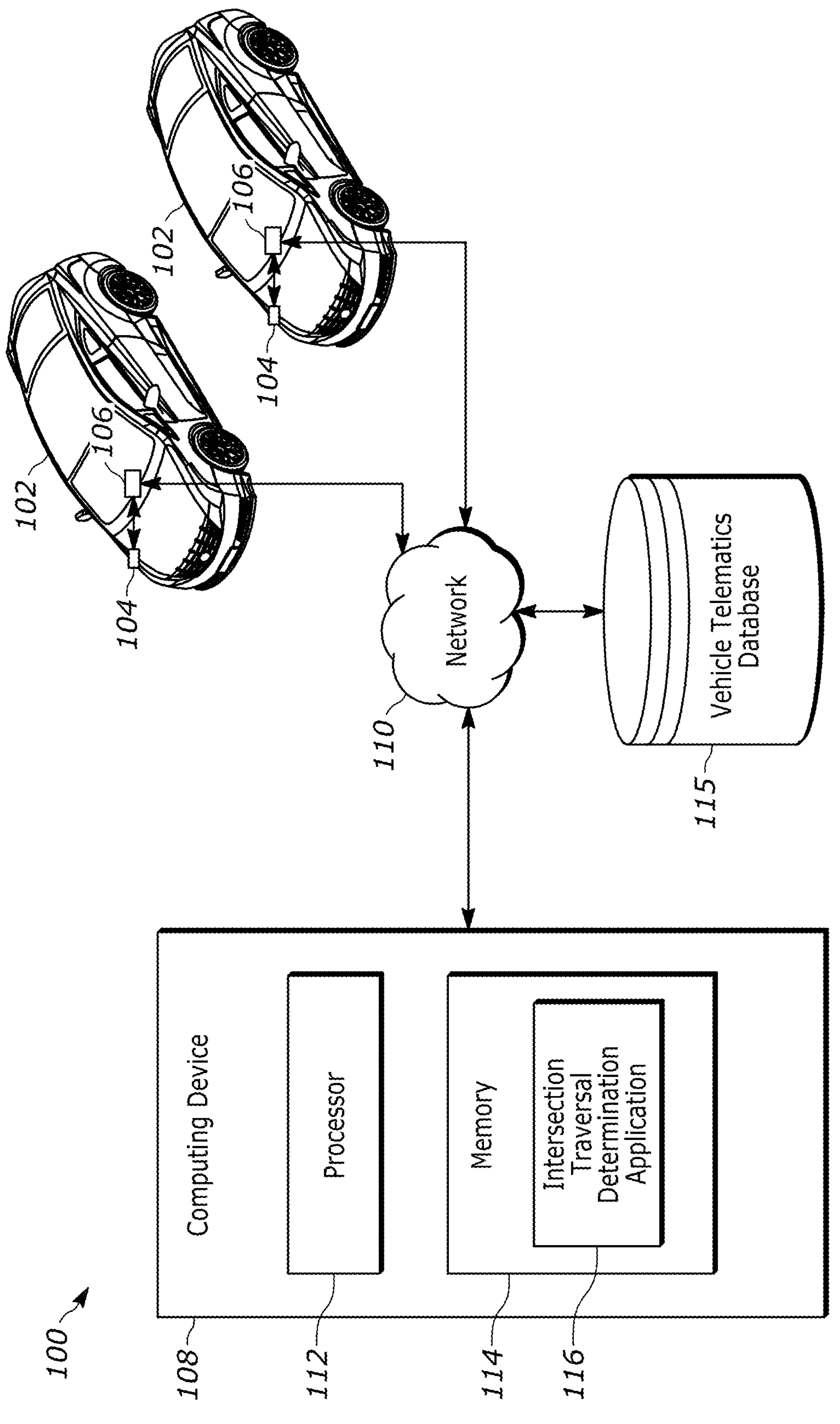
FIG. 1 illustrates a block diagram of an example system for determining whether a vehicle has traversed an intersection, in accordance with some embodiments.

Generally, the present disclosure provides techniques for determining whether a particular vehicle made a particular turn through a particular intersection, using several successively more processor-intensive ways of checking that a vehicle made a particular turn through a particular intersection. By eliminating vehicle trips that do not include the particular turn using less processor-intensive steps first, the overall processing power and time required for this method may be decreased, as only the vehicle trips that are most likely to include the particular turn through the particular intersection are subjected to the more processor-heavy steps.

In an example, telematics data from a vehicle's trip may be obtained. In some examples, a simplified line may be generated based on the telematics data from the vehicle's trip. For example, the average simplified line may be generated using methods described by U.S. patent application Ser. No. 17/188,767, entitled "SYSTEMS AND METHODS OF COLLAPSE OF DRIVING DATA TO DETERMINE SPATIAL AVERAGES OF VEHICLE PATHS WITHIN AN INTERSECTION," the entire disclosure of which is incorporated by reference herein. The first step (i.e., the first 'test") involves applying a shape (e.g., box, circle, etc.) or other boundary representing the general area of the intersection to the telematics data from the vehicle to isolate vehicle telematics data points that are within the shape. That is, spatial data representative of a boundary associated with a particular intersection may be obtained and compared to simplified line to determine where the simplified line crosses (i.e., intersects with) the boundary. Generally speaking, if the telematics data from the vehicle's trip does not fall within the shape (i.e., if vehicle telematics data points are within the shape), the vehicle did not travel through the intersection, and no further steps are needed for analysis of that particular trip. Consequently, in some examples, if the telematics data from a particular vehicle trip fails this first "test," there is no need to expend any further processing power to analyze the telematics data from that particular vehicle trip.

If at least some of vehicle telematics data from the trip does fall within the boundary and/or shape associated with the intersection, the second step (i.e., the second "test") involves comparing the isolated vehicle telematics data from the vehicle trip that is associated with the intersection (i.e., a simplified line generated based on the isolated vehicle telematics data from the vehicle trip that falls within the shape or boundary) to vector lines that are perpendicular to the flow of traffic and generally represent entrances and exits of the intersection. For instance, for a simple intersection in which two roads intersect, there may be four such vector lines, and for an intersection in which three roads intersect, there may be six such vector lines, etc. Furthermore, generally speaking, if the simplified line generated based on the isolated vehicle telematics data from the vehicle trip that falls within the shape or boundary does not intersect with two vector lines that represent a turn (i.e., if the simplified line does not intersect with any of the vector lines, if the simplified line only intersects with one vector line, etc.), then the vehicle likely did not turn through the intersection and no further steps are needed for analysis of that particular trip. Consequently, in some examples, even if the telematics data from a particular vehicle trip passes the first "test", if this telematics data fails this second "test," there is no need to expend any further processing power analyzing the telematics data from that particular vehicle trip.

Finally, if the simplified line generated based on the isolated vehicle telematics data from the vehicle trip that falls within the shape or boundary intersects with two vector lines that represent a turn, the final step involves comparing the telematics data from the vehicle trip to an average spatial path of turns that intersect the same two vector lines made by other vehicles. If a simplified line generated based on the isolated vehicle telematics data from the vehicle trip that falls within the shape or boundary differs from the average spatial path of the turn through the intersection by more than a threshold amount, then the vehicle's trip through the intersection may be flagged as invalid and may be accordingly excluded from analytics that focus on valid trips through the intersection.

Once it is determined that the vehicle made a valid trip through the intersection (e.g., the vehicle's line passes all three "tests" or "checks"), the telematics data from the vehicle's turn through the intersection can be effectively compared to average telematics data from other vehicles that made the same turn. In other words, the raw telematics data points over the same time period as the simplified line of the vehicle's traversal through the intersection, which indicate the vehicle's acceleration data, speed data, braking data, etc., through the intersection, may be compared to averages of these values from other vehicles that made the same turn through the same intersection. Specifically, once the simplified line is validated, indicating that the vehicle's trip through the intersection matches a particular turn, the raw data points from the vehicle's trip through the intersection may be isolated by extracting them from the full raw data table by time range associated with the simplified line segment. These raw points may be further isolated by being within the shape of the bounding box of the intersection. These points may then be aggregated to determine the average, minimum and maximum acceleration values of the vehicle's trip through the intersection. These values may be compared to the corresponding average values of vehicles making that turn to identify outliers who may be a higher risk.

Advantageously, the processing power required for each "test" is only used when the vehicle telematics data from a particular vehicle trip "passes" all previous tests, and the processing power required for the analysis and comparison to other vehicles' turns through the intersection is only used when the telematics data from a particular vehicle trip passes all three "tests." In this way, the processing power and processing time required for comparing telematics data from one vehicle's turn through an intersection to other vehicles' turns through the same intersection is greatly reduced because only relevant turns are ultimately compared to one another.

FIG. 1 illustrates a block diagram of an example system 100 for determining whether a vehicle has traversed an intersection, in accordance with some embodiments. The high-level architecture illustrated in FIG. 1 may include both hardware and software applications, as well as various data communications channels for communicating data between the various hardware and software components, as is described below.

The system 100 may include a plurality of vehicles 102, each equipped with various sensors 104. The sensors 104 of each vehicle 102 may communicate, via a wired or wireless connection, with respective vehicle computing devices 106. In some examples, the vehicle computing devices 106 may be on-board computing devices. The vehicle computing devices 106 may communicate with another computing device 108, e.g., via signals sent over a network 110. For instance, the vehicle computing devices 106 may send telematics data or other measurements captured by the sensors 104 to the computing device 108 via the network 110.

The sensors 104 may include location sensors (e.g., GPS) and motion sensors (e.g., accelerometers, gyrometers, etc.) and other suitable vehicle telematics sensors configured to capture indications of the motion and operation of the respective vehicles 102 over time, as well as a clock function configured to timestamp various sensor readings and vehicle telematics data captured by the sensors 104.

The computing device 108 may include one or more processors 112 and a memory 114. The one or more processors 112 may interact with the memory 114 to obtain, for example, computer-readable instructions stored in the memory 114. The computer-readable instructions stored in the memory 114 may cause the one or more processors 112 to store telematics data sent by the vehicle computing device 106 in a vehicle telematics database 115, to access telematics data from the vehicle telematics database 115, and/or to execute one or more applications, such as intersection traversal determination application 116. The vehicle telematics database 115 may include telematics data from a plurality of vehicle trips made by a plurality of different vehicles 102.

Figure 2:
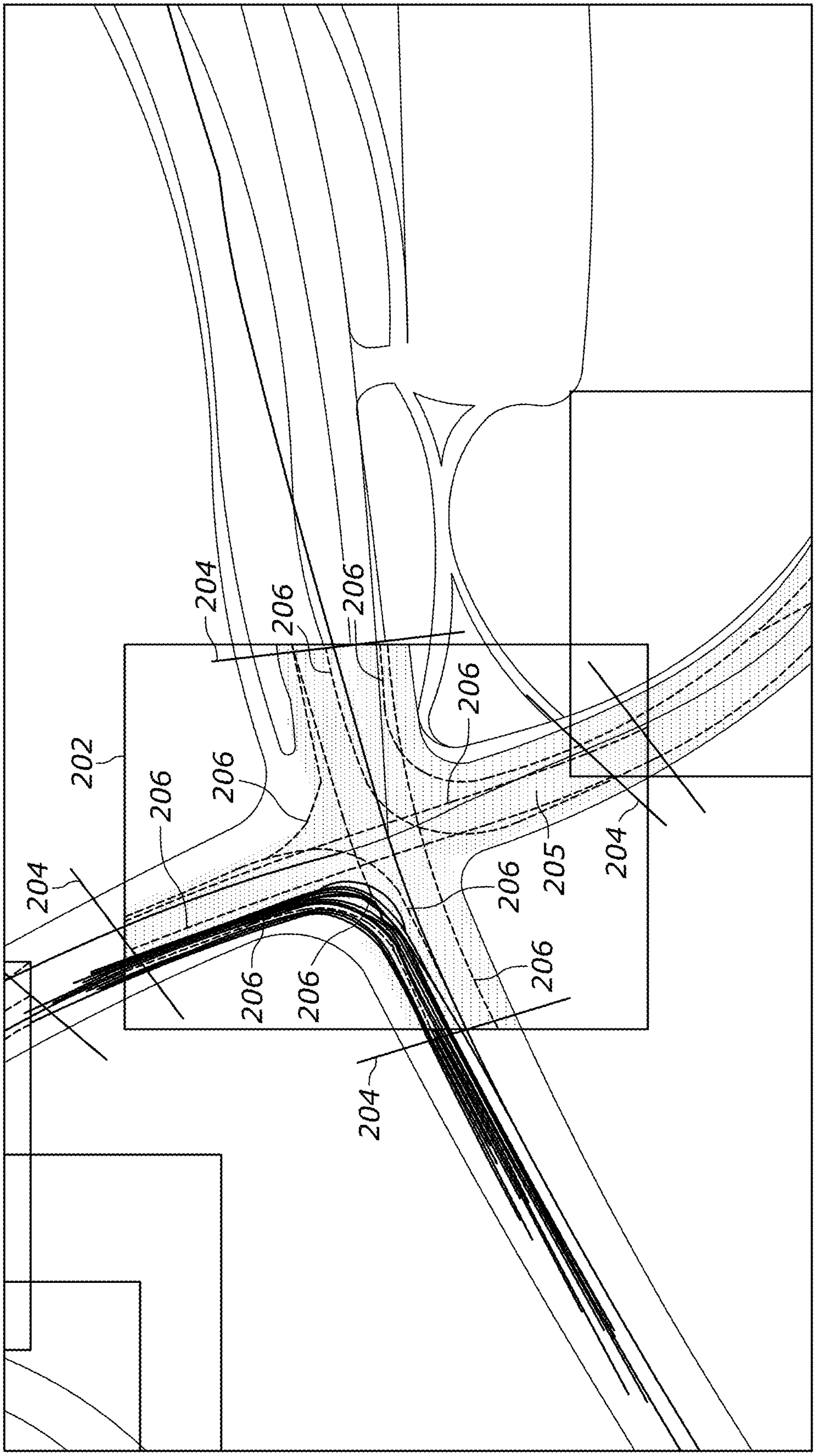
FIG. 2 illustrates a visualization of vehicle telematics data points associated with vehicle trips through a particular intersection, in accordance with some embodiments.

Executing the intersection traversal determination application 116 may include obtaining vehicle telematics data associated with a particular vehicle trip (e.g., as sent to the computing device 108 from the vehicle computing device 106, and/or as stored in the vehicle telematics database 115) by one of the vehicles 102, and attempting to isolate one or more telematics data points associated with the vehicle trip that fall within an intersection of interest. FIG. 2 illustrates a visualization of vehicle telematics data points associated with vehicle trips through a particular intersection. As shown in FIG. 2, a shape or other boundary 202 representing the general area of an intersection of interest may be compared to the telematics data points associated with the vehicle trip, in order to isolate any vehicle telematics data points associated with the particular vehicle trip that fall within the shape or other boundary 202. For instance, as shown in FIG. 2, all data points 205 are vehicle telematics data points from various vehicles that fall within the shape or other boundary 202. If this attempt fails (i.e., if none of the telematics data points associated with the vehicle trip fall within the shape or other boundary 202), then executing the intersection traversal determination application 116 may include ceasing the analysis of the vehicle trip with respect to the particular intersection of interest.

If one or more vehicle telematics data points associated with the particular vehicle trip do fall within the shape or other boundary 202, then executing the intersection traversal determination application 116 may include generating a simplified line using the vehicle telematics data points associated with the particular vehicle trip that fall within the shape or other boundary 202 and comparing this simplified line to vector lines 204 that represent possible entrances and/or exits of the intersection of interest. These vector lines 204 may be generally perpendicular (or close to perpendicular, i.e., 80-100 degrees) to the flow of traffic through the intersection, and comparing the simplified line to the vector lines 204 may include determining if the simplified line intersects with any of the vector lines 204. If the simplified line does not intersect with at least one vector line 204 representing an entrance into the intersection and at least one vector line 204 representing an exit from the intersection, then executing the intersection traversal determination application 116 may include ceasing the analysis of the vehicle trip with respect to the particular intersection of interest.

If the simplified line intersects with at least one vector line 204 representing an entrance into the intersection and at least one vector line 204 representing an exit from the intersection, then executing the intersection traversal determination application 116 may include comparing the simplified line to an average vehicle path 206 through the intersection using the same entrance and the same exit. For instance, if the simplified line intersects with a North entrance to the intersection and an East exit from the intersection, the simplified line may be compared to an average path of vehicles that enter the intersection via the North entrance and exit the intersection via the East exit. Comparing the simplified line to the average vehicle path 206 through the intersection using the same entrance and the same exit may include calculating a spatial distance between the simplified line and the average vehicle path 206 through the intersection using the same entrance and the same exit, and determining whether the spatial distance is greater than a threshold spatial distance. In some examples, calculating this spatial distance includes calculating a Hausdorff distance or a Fréchet distance between the two lines. Generally speaking, a Hausdorff distance, or Hausdorff metric, also called Pompeiu-Hausdorff distance, measures how far two subsets of a metric space are from each other, and a Fréchet distance is a measure of similarity between curves that takes into account the location and ordering of the points along the curves. In any case, if the spatial distance between the simplified line and the average vehicle path 206 through the intersection using a particular entrance and exit is greater than the threshold spatial distance, the vehicle likely did not make the turn of interest through the intersection using that particular entrance and exit. Accordingly, if the spatial distance between the simplified line and the average vehicle path 206 through the intersection using a particular entrance and exit is greater than the threshold spatial distance, then executing the intersection traversal determination application 116 may include ceasing the analysis of the vehicle trip with respect to the particular intersection of interest.

If the spatial distance between the simplified line and the average vehicle path 206 through the intersection using a particular entrance and exit is less than the threshold spatial distance, then the vehicle likely made the turn of interest through the intersection using that particular entrance and exit. Accordingly, executing the intersection traversal determination application 116 may include comparing the isolated telematics data points from the vehicle trip that fall within the shape or boundary associated with the intersection to telematics data from other vehicles that traversed the intersection using the same entrance and exit. For instance, in this case, executing the intersection traversal determination application 116 may include comparing an average acceleration, speed, measure of braking, and/or measure of cornering associated with the isolated telematics data points from the vehicle trip that fall within the shape or boundary associated with the intersection to an average acceleration, speed, measure of braking, and/or measure of cornering of other vehicles through the same turn of the intersection.

This comparison may be used to assess how the driver's acceleration, speed, braking, cornering, etc., through the intersection during that vehicle trip compares to that of other drivers that have made the same turn, i.e., to determine whether the driver operated the vehicle more or less safely on average compared to other drivers during that vehicle trip. For example, drivers who operate their vehicles more safely on average compared to other drivers who make the same maneuvers may be eligible for discounts. In some examples, executing the intersection traversal determination application 116 may include generating warnings, guidance, or other notifications to drivers who operate their vehicles less safely on average compared to other drivers who make the same maneuvers.

Furthermore, the computer-readable instructions stored on the memory 114 may include instructions for carrying out any of the steps of the method 300, described in greater detail below with respect to FIG. 3.

Figure 3:
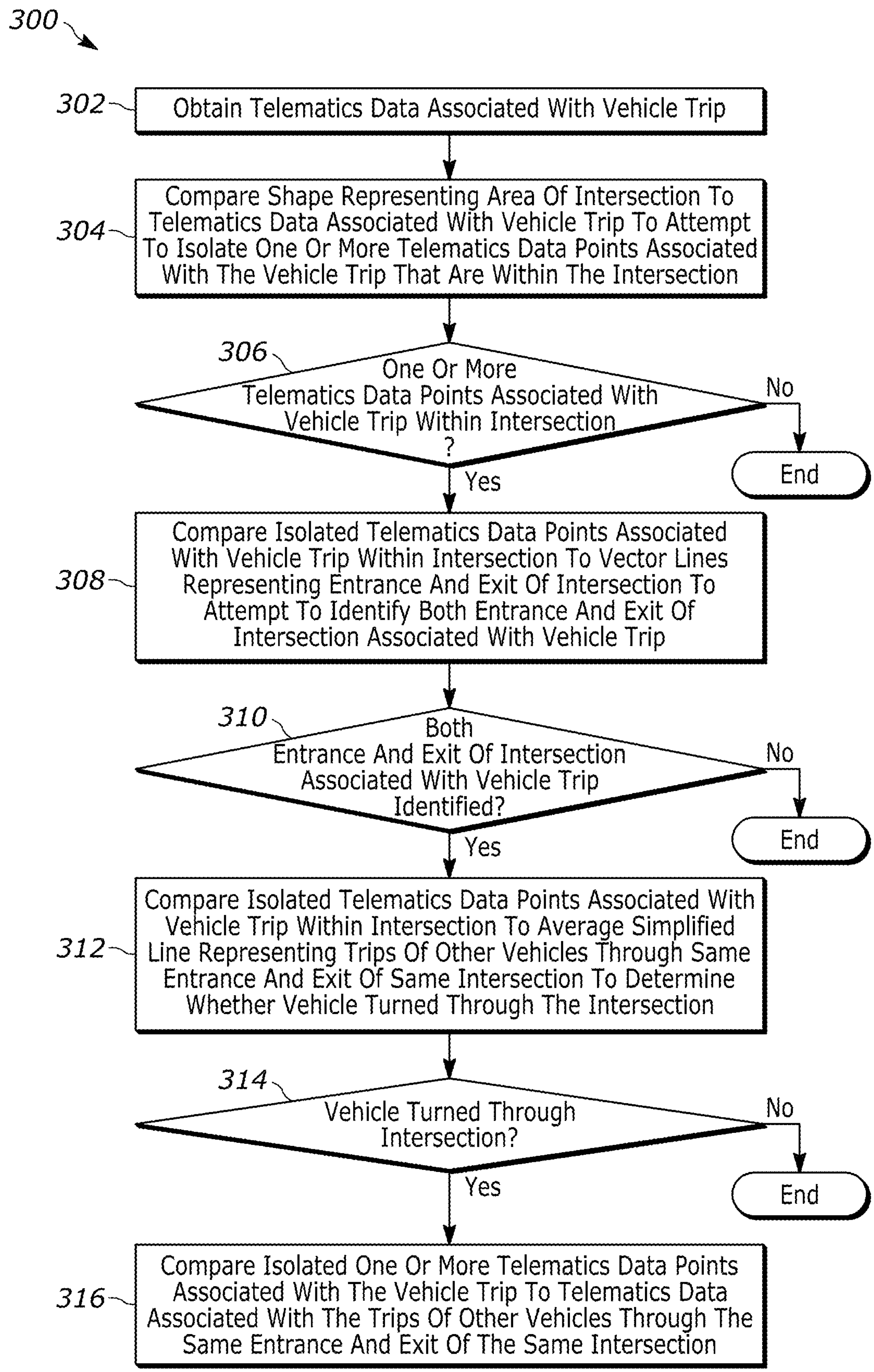
FIG. 3 illustrates a flow diagram of an example method for determining whether a vehicle has traversed an intersection, in accordance with some embodiments.

FIG. 3 illustrates a flow diagram of an example method 300 for determining whether a vehicle has traversed an intersection, in accordance with some embodiments. One or more steps of the method 300 may be implemented as a set of instructions stored on a computer-readable memory 114 and executable on one or more processors 112.

The method 300 may begin when telematics data associated with a particular vehicle trip made by a particular vehicle is obtained (block 302). For instance, obtaining the telematics data associated with a particular trip made by a particular vehicle may include accessing a vehicle telematics database 115 that stores telematics data associated with various trips made by various vehicles 102. For example, as discussed above, vehicle computing devices 106 associated with vehicles 102 may send telematics data or other measurements captured by sensors 104 to a computing device 108 via the network 110. The computing device 108 (i.e., the computing device executing the steps of the method 300) may store this telematics data locally and/or may store the telematics data in the database 115.

A shape or other boundary representing an area associated with a particular intersection may be compared (block 304) to the telematics data associated with the particular vehicle trip to attempt to isolate one or more telematics data points of the telematics data associated with the vehicle trip that fall within the intersection. In other words, if any portion of the vehicle trip that is associated with the particular intersection, the telematics data points associated with that portion of the vehicle trip may be isolated from the telematics data points from other portions of the vehicle trip. If none of the telematics data points associated with the vehicle trip fall within the shape or boundary representing the area associated with the particular intersection (block 306, NO), then the vehicle trip likely did not include any traversals of that particular intersection, and the method 300 may end without any further processing steps.

In contrast, if at least one of the telematics data points associated with the vehicle trip falls within the shape or boundary representing the area associated with the particular intersection (block 306, YES), then the vehicle trip may have included a traversal of that particular intersection. Any telematics data points associated with the vehicle trip that fall within the shape or boundary representing the area associated with the particular intersection may be isolated and compared (block 308) to a plurality of vector lines representing entrances and exits of the intersection to attempt to identify both an entrance of the intersection and an exit of the intersection associated with the vehicle trip. For instance, the vector lines representing the entrances and exits of the intersection may generally be oriented perpendicular to the flow of traffic through the intersection. In some examples, comparing the isolated telematics data points that fall within the area of the particular intersection to the vector lines may include generating a simplified line based on the isolated telematics data points that fall within the area of the particular intersection, and determining whether the simplified line intersects with any of the vector lines representing the entrances and exits of the intersection. For instance, if the simplified line does not intersect any of the vector lines representing entrances and exits of the intersection, or if the simplified line only intersects with one of the vector lines representing entrances and exits of the intersection, then the vehicle trip likely did not include a traversal through that particular intersection (block 310, NO), and the method 300 may end without any further processing steps.

In contrast, if the simplified line generated based on the isolated telematics data points that fall within the shape or boundary associated with the intersection intersects both a vector line representing an entrance of the intersection and a vector line representing an exit of the intersection (block 310, YES), then the vehicle trip may include a traversal through that particular intersection. Based on identifying both an entrance of the intersection and an exit of the intersection associated with the vehicle trip, the simplified line generated based on the isolated telematics data points that fall within the shape or boundary associated with the intersection may be compared (block 312) to an average simplified line representing trips of other vehicles through the same entrance and exit of the same intersection, i.e., to determine whether the particular vehicle turned through the particular intersection. For instance, if the simplified line generated based on the isolated telematics data points that fall within the shape or boundary associated with the intersection differs from the average simplified line representing the trips of other vehicles through the same entrance and exit of the same intersection by greater than a threshold degree, then the vehicle trip likely did not include a traversal through that entrance and exit of the intersection (block 314, NO), and the method 300 may end without any further processing steps. For instance, in some examples, a discrepancy or deviation may indicate that the vehicle may have made a U-turn, or may have turned into a parking lot near the intersection. Moreover, in some examples, a discrepancy or deviation may indicate that the vehicle may be driving unsafely or erratically through the intersection. In any case, however, a large discrepancy or deviation may indicate that the simplified line may be difficult to compare to an average simplified line representing the trips of other vehicles through the same entrance and exit of the same intersection for the purposes of comparing the vehicle's telematics data to telematics data associated with other vehicles that traveled through the same intersection.

In contrast, if the simplified line generated based on the isolated telematics data points that fall within the shape or boundary associated with the intersection differs from the average simplified line representing the trips of other vehicles through the same entrance and exit of the same intersection by less than the threshold degree, the vehicle trip likely did include a traversal through that entrance and exit of the intersection (block 314, YES). Based on determining that the vehicle trip likely did include a traversal through that entrance and exit of the intersection, the isolated telematics data points that fall within the shape or boundary associated with the intersection may be compared (block 316) to telematics data associated with the trips of other vehicles through the same entrance and exit of the same intersection. For instance, an average acceleration, speed, measure of braking, and/or measure of cornering associated with the isolated telematics data points from the vehicle trip that fall within the shape or boundary associated with the intersection may be compared to an average acceleration, speed, measure of braking, and/or measure of cornering of other vehicles through the same turn of the intersection.

This comparison may be used to assess how the driver's acceleration, speed, braking, cornering, etc., through the intersection during that vehicle trip compares to that of other drivers that have made the same turn, i.e., to determine whether the driver operated the vehicle more or less safely on average compared to other drivers during that vehicle trip. For example, drivers who operate their vehicles more safely on average compared to other drivers who make similar maneuvers may be eligible for discounts. As another example, the method 300 may include generating warnings, guidance, or other notifications to drivers who operate their vehicles less safely on average compared to other drivers who make similar maneuvers.

With the foregoing, an insurance customer may opt-in to a rewards, insurance discount, or other type of program. After the insurance customer provides their affirmative consent, an insurance provider remote server may collect data from the customer's mobile device or other smart devices-such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method, comprising:

obtaining, by one or more processors, telematics data, associated with a vehicle trip of a vehicle, that is captured within an area associated with an intersection;

identifying, by the one or more processors, an entrance and an exit of the intersection corresponding to the telematics data associated with the vehicle trip that is captured within the area associated with the intersection;

generating, by the one or more processors, a line representing the telematics data associated with the vehicle trip that is captured within the area associated with the intersection;

comparing, by the one or more processors, the line representing the telematics data associated with the vehicle trip that is captured within the area associated with the intersection to a line representing actual turns of other vehicles through a same entrance and a same exit of a same intersection to:

(i) determine whether the vehicle turned through the intersection, and (ii) determine whether the vehicle made another turn near the intersection without passing through the intersection; and based on determining that the vehicle turned through the intersection, comparing, by the one or more processors, the telematics data associated with the vehicle trip that is captured within the area associated with the intersection to telematics data associated with the actual turns of the other vehicles through the same entrance and the same exit of the same intersection.

2. The computer-implemented method of claim 1, further comprising:

determining, by the one or more processors, based on comparing the telematics data associated with the vehicle trip to the telematics data associated with the actual turns of the other vehicles through the same entrance and the same exit of the same intersection, whether one or more of a minimum acceleration, average acceleration, or maximum acceleration of the vehicle through the intersection was greater than a respective aggregated minimum acceleration, average acceleration, or maximum acceleration of the other vehicles through the same intersection.

3. The computer-implemented method of claim 1, further comprising:

determining, by the one or more processors, based on comparing the telematics data associated with the vehicle trip to the telematics data associated with the actual turns of the other vehicles through the same entrance and the same exit of the same intersection, whether one or more of a minimum speed, average speed, or maximum speed of the vehicle through the intersection was greater than a respective aggregated minimum speed, average speed, or maximum speed of the other vehicles through the same intersection.

4. The computer-implemented method of claim 1, further comprising:

determining, by the one or more processors, based on comparing the telematics data associated with the vehicle trip to the telematics data associated with the actual turns of the other vehicles through the same entrance and the same exit of the same intersection, whether a measure of braking of the vehicle through the intersection exceeds an average measure of braking of the other vehicles through the same intersection.

5. The computer-implemented method of claim 1, further comprising:

determining, by the one or more processors, based on comparing the telematics data associated with the vehicle trip to the telematics data associated with the actual turns of the other vehicles through the same entrance and the same exit of the same intersection, whether a measure of cornering of the vehicle through the intersection exceeds an average measure of cornering of the other vehicles through the same intersection.

6. A non-transitory computer-readable storage medium comprising instructions that, when executed, cause a machine to:

obtain telematics data, associated with a vehicle trip of a vehicle, that is captured within an area associated with an intersection;

identify an entrance and an exit of the intersection corresponding to the telematics data associated with the vehicle trip that is captured within the area associated with the intersection;

generate a line representing the telematics data associated with the vehicle trip that is captured within the area associated with the intersection;

compare the line representing the telematics data associated with the vehicle trip that is captured within the area associated with the intersection to a line representing actual turns of other vehicles through a same entrance and a same exit of a same intersection to:

(i) determine whether the vehicle turned through the intersection, and (ii) determine whether the vehicle made another turn near the intersection without passing through the intersection; and based on determining that the vehicle turned through the intersection, compare the telematics data associated with the vehicle trip that is captured within the area associated with the intersection to telematics data associated with the actual turns of the other vehicles through the same entrance and the same exit of the same intersection.

7. The non-transitory computer-readable storage medium of claim 6, wherein the instructions further cause the machine to:

determine, based on comparing the telematics data associated with the vehicle trip to the telematics data associated with the actual turns of the other vehicles through the same entrance and the same exit of the same intersection, whether one or more of a minimum acceleration, average acceleration, or maximum acceleration of the vehicle through the intersection was greater than a respective aggregated minimum acceleration, average acceleration, or maximum acceleration of the other vehicles through the same intersection.

8. The non-transitory computer-readable storage medium of claim 6, wherein the instructions further cause the machine to:

determine, based on comparing the telematics data associated with the vehicle trip to the telematics data associated with the actual turns of the other vehicles through the same entrance and the same exit of the same intersection, whether one or more of a minimum speed, average speed, or maximum speed of the vehicle through the intersection was greater than a respective aggregated minimum speed, average speed, or maximum speed of the other vehicles through the same intersection.

9. The non-transitory computer-readable storage medium of claim 6, wherein the instructions further cause the machine to:

determine, based on comparing the telematics data associated with the vehicle trip to the telematics data associated with the actual turns of the other vehicles through the same entrance and the same exit of the same intersection, whether a measure of braking of the vehicle through the intersection exceeds an average measure of braking of the other vehicles through the same intersection.

10. The non-transitory computer-readable storage medium of claim 6, wherein the instructions further cause the machine to:

determine, based on comparing the telematics data associated with the vehicle trip to the telematics data associated with the actual turns of the other vehicles through the same entrance and the same exit of the same intersection, whether a measure of cornering of the vehicle through the intersection exceeds an average measure of cornering of the other vehicles through the same intersection.

11. A computing device, comprising a processor and a memory storing instructions that, when executed by the processor, cause the processor to:

obtain telematics data, associated with a vehicle trip of a vehicle, that is captured within an area associated with an intersection;

identify an entrance and an exit of the intersection corresponding to the telematics data associated with the vehicle trip that is captured within the area associated with the intersection;

generate a line representing the telematics data associated with the vehicle trip that is captured within the area associated with the intersection;

compare the line representing the telematics data associated with the vehicle trip that is captured within the area associated with the intersection to a line representing actual turns of other vehicles through a same entrance and a same exit of a same intersection to:

(i) determine whether the vehicle turned through the intersection, and (ii) determine whether the vehicle made another turn near the intersection without passing through the intersection; and based on determining that the vehicle turned through the intersection, compare the telematics data associated with the vehicle trip that is captured within the area associated with the intersection to telematics data associated with the actual turns of the other vehicles through the same entrance and the same exit of the same intersection.

12. The computing device of claim 11, wherein the instructions further cause the processor to:

determine, based on comparing the telematics data associated with the vehicle trip to the telematics data associated with the actual turns of the other vehicles through the same entrance and the same exit of the same intersection, whether a measure of braking of the vehicle through the intersection exceeds an average measure of braking of the other vehicles through the same intersection.

13. The computing device of claim 11, wherein the instructions further cause the processor to:

determine, based on comparing the telematics data associated with the vehicle trip to the telematics data associated with the actual turns of the other vehicles through the same entrance and the same exit of the same intersection, whether a measure of cornering of the vehicle through the intersection exceeds an average measure of cornering of the other vehicles through the same intersection.

14. The computing device of claim 11, wherein the instructions further cause the processor to:

determine, based on comparing the telematics data associated with the vehicle trip to the telematics data associated with the actual turns of the other vehicles through the same entrance and the same exit of the same intersection, whether a measure of braking of the vehicle through the intersection exceeds an average measure of braking of the other vehicles through the same intersection.

15. The computing device of claim 11, wherein the instructions further cause the processor to:

determine, based on comparing the telematics data associated with the vehicle trip to the telematics data associated with the actual turns of the other vehicles through the same entrance and the same exit of the same intersection, whether a measure of cornering of the vehicle through the intersection exceeds an average measure of cornering of the other vehicles through the same intersection.

* * * * *